United States Patent Office 2,968,022
Patented Jan. 10, 1961

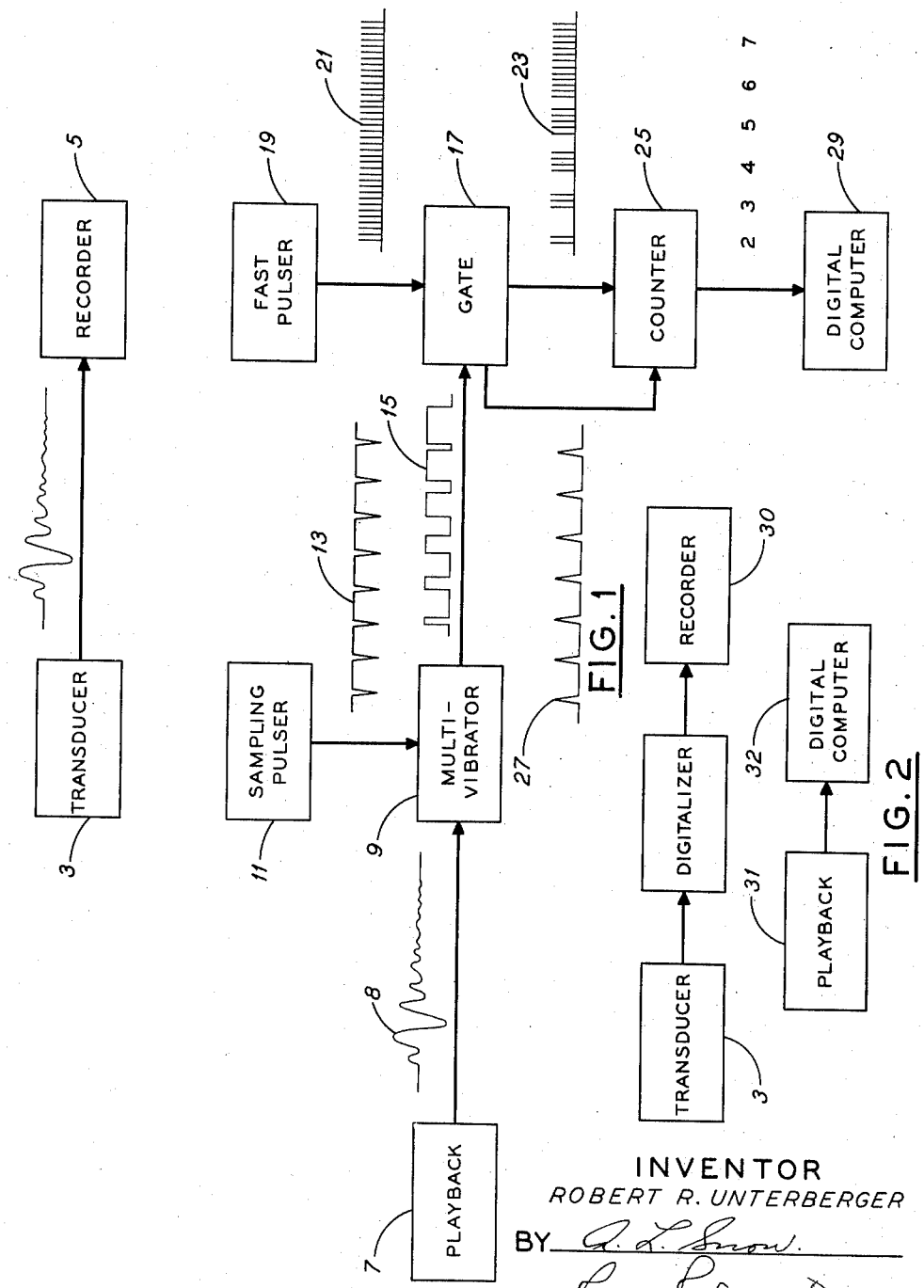

2,968,022

SEISMIC SIGNAL DIGITALIZATION METHOD AND APPARATUS

Robert R. Unterberger, Whittier, Calif., assignor to California Research Corporation, San Francisco, Calif., a corporation of Delaware Filed Oct. 11, 1954, Ser. No. 461,606

1 Claim. (Cl. 340—15)

My invention relates to a method and apparatus for converting an electrical signal to digital form, and particularly to a method and apparatus for converting a seismic signal to a series of digits representing the signal.

My invention has particular applicability to the encoding of seismic records in digital form so that a digital computer can be utilized to process the seismic records. Hitherto, seismic records have been processed by trained seismologists. This processing has been found to be time consuming and difficult. Accordingly, I have concluded that some of the difficulties of manual record interpretation can be removed if the process can be mechanized. If the seismic traces can be converted to digital form in such a way that the digits completely define the traces, a digital computer may be coded to pick the records in a manner equivalent to that of a highly trained seismologist. In order for the records to be processed, and information thereby extracted, criteria of alignment must be established. The computer may be coded to recognize phase, frequency, or amplitude correlation between adjacent traces of the same seismic record or between traces of two or more seismic records shot in the same regional area. A computer capable of performing the correlations above identified is discussed in Geophysics, vol. XVIII, 1953, at page 539, in an article entitled "Detection of Reflections on Seismic Records by Linear Operators," by G. P. Wadsworth et al.

In apparatus according to my invention, the seismic signal is recorded, then played back to provide a voltage representing the motion of the earth. This voltage is converted to a number of groups of pulses, the number of pulses in each group representing the instantaneous amplitude of the voltage signal. The pulses are counted to provide numbers which are placed in a digital computer. The computer is coded to apply predetermined criteria of alignment to the record and, thereby, to pick the record.

The novel features of my invention are set forth with more particularity in the accompanying claim. The invention itself, however, with respect to the details thereof, together with its additional objects and advantages, may be better understood from the following description of specific embodiments with reference to the accompanying drawings, in which:

Fig. 1 shows schematically one embodiment of my invention; and

Fig. 2 shows schematically another embodiment of my invention.

According to the conventional seismic method, a charge of explosive is detonated on or near the surface of the earth and reflections from subterranean geological formations, together with a large amount of noise, are detected by a seismic transducer. As shown in the drawing, the transducer 3, which may be an electromagnetic or piezoelectric transducer, converts the vibrational energy from the explosion to an electrical signal which is transmitted to a recorder 5. According to the preferred embodiment of my invention, the recorder 5 is a magnetic recorder which receives signals from several transducers, recording them on the same time base. Any magnetic, reproducible recorder having sufficient amplitude, frequency range, and channel capacity may be used. The magnetic medium which bears the recording of the seismic signals is placed in a playback instrument 7, the output of which is a number of time-varying voltages 8, each of which represents a seismic signal detected by the seismic transducer 3. The signals shown in Fig. 1 are merely examples and are not drawn to the same time scale. Each of the seismic playback signals 8 provides a control voltage for a multivibrator 9. A sampling pulser 11 triggers the multivibrator. The multivibrator is so arranged that the sampling pulser excites it to emit a pulse. The duration of the pulse is determined by the amplitude of the playback signal 8 at the time of the sampling pulse.

According to the preferred embodiment of my invention, a wide-band recording of the seismic signal is made by the recorder 5. If the highest frequency component of the seismic signal from the playback 7 does not exceed 200 cycles per second, signal 13 may be as low as 400 pulses per second. The output of the multivibrator 9 will be a signal 15 which constitutes a series of pulses of varying widths. The beginnings of the separate pulses are equally spaced in time and are equal to the period of the sampling pulses, but their durations are proportional to the amplitude of the signal 8 from the playback 7. The time scale of signals 13 and 15 is much expanded as compared with the time scale of signal 8.

The signal 15 enters a gating circuit 17. A fast pulser 19 emits a signal 21 which constitutes a series of sharp pulses of a pulse repetition frequency much greater than that of the sampling pulses from the sampling pulser 11. The rate of the signal 21 may be of the order of 40,000 pulses per second. The gating circuit 17 permits signals 21 to pass from the fast pulser 19 through the gate 17 only during the positive portion of the pulses 15. The output 23 of the gate, then, is a number of groups of fast pulses, each group having a width equal to the width of the corresponding positive pulse of signal 15. During the positive period of pulses 15, the pulses from the fast pulser enter a counter 25. A second circuit from the gate 17 to the counter 25 provides pulses 27 which reads out and resets the counter at the end of each positive pulse from the multivibrator 9. The counter 25 counts the number of pulses from the fast pulser 19 in each group, thereby generating a binary coded signal which is read out to the digital computer input device 29. The digital computer is then programmed to compare the seismic signals from the various channels of magnetic recording and pick the seismic record.

It is to be noted that the playback 7, multivibrator 9, gate 17, and counter 25 are multichannel. The playback provides simultaneously a number of voltages 8 which correspond to the number of seismic signals recorded. The multivibrators 9 and gates 17 separately modulate each of the channels, and the counter 25 separately and simultaneously counts the pulses 23 representing the time-sequenced amplitude of the seismic signal in each channel. The numbers from the counter 25 are fed separately into the computer input device so that, at regular intervals corresponding to the sampling rate set by the pulser 11, the computer input device 29 receives a group of numbers representing the instantaneous amplitudes of the seismic signals.

For a more detailed explanation of the internal mechanism of the various elements of applicant's apparatus, reference is made to Electronics, by Elmore and Sands, McGraw-Hill Book Company, Inc., New York, 1949. The multivibrator 9 is similar to that shown in Fig. 2.34(a), page 91. The signal from the sampling pulser 11 is impressed on the anode of tube T-2. The seismic signal from the playback 7 is impressed on the grid of tube T-2. The signal which passes to the gating circuit 17 is derived through a capacitor from the anode of tube T-1.

The sampling pulser 11 may be a free-running, blocking oscillator such as that shown in Fig. 2.31, page 84. The connection in Fig. 2.31 marked "signal out" leads to the plate of tube T-2, Fig. 2.34(a) through a suitable capacitor.

The fast pulser 19 is the same as the pulser shown in Fig. 2.31, except that the resistor R-3 and the capacitor C-1 are changed to cause a high pulse rate; or, alternatively, the resistor R-3 may be turned to the B+, as mentioned on page 83.

The gate 17 could be a 6BN6, which is a coincidence tube. Alternately, a pentode could be used with the two control elements of the gate being the control grid and the suppressor grid. The modulated signal 15 is impressed on control grid No. 1. The signal 21 from the fast pulser is impressed on control grid No. 2. The output is derived from the plate when suitable tube electrode potentials are applied.

One unit of counter 25 is shown in Fig. 4.2, page 210. In order to digitalize amplitudes over a wide range, seven or more of the circuits shown in Fig. 4.2 should be cascaded, the "Out" connection of each counter except the last being connected to the "In" connection of a succeeding counter. Each "Out" connection may be connected to the computer. The signal from the gate 17 is impressed at the point marked "In," and the signal to the digital computer is derived from each section of the counter at the point marked "Out." The signal derived from the counter may be recorded on a magnetic tape or other recording apparatus or it may be fed directly into a digital computer.

My invention has been described with reference to the use of a recorder 5 in connection with the transducer 3, as shown in Fig. 1. Instead, the transducer 3 may be connected directly to the digitalizer as shown in Fig. 2. The digitalizer contains the elements 9, 11, 17, 19 and 25 shown in Fig. 1. The output of the digitalizer is fed into a recorder 30. The recording from the recorder 30 is placed in the playback 31, which provides an input signal for the digital computer 32. The input device of the digital computer may involve immediate use of the input data of the computer or it may be a storage device for the data.

While I have described my invention with respect to specific embodiments, I understand that many modifications thereof may be made without departing from the scope of the invention. For example, a number of alternative electronic circuits may be employed as the functional elements of my apparatus. I do not intend, therefore, to limit my invention except as set forth in the appended claim.

I claim:

An analysis apparatus for a multitrace record of seismic signals comprising in combination, a plurality means for converting each of said seismic signals within said records to a series of first pulses, means for initiating said first pulses sequentially at uniform time intervals to establish in serial relationship the beginning of each respective first pulse at a predetermined uniform time interval, said means for initiating being repetitive at a substantially higher rate than the seismic signals within said records, means for proportioning the duration of sequential first pulses in accordance with the amplitude of sequential incremental portions of said seismic signals, a source of second pulses having a high frequency relative to said series of first pulses, a plurality of gating means, a computer, circuit means connecting said source of second pulses to said computer through said gating means, means employing said series of first pulses from said plurality of means for converting said seismic signals to gate said circuit means connecting said second pulses to said computer at said uniform time intervals and in accordance with the duration of each of said series of first pulses to produce an input of digitalized seismic signals representing the sequential amplitude along said multitrace record, and means in said computer for comparing said digitalized seismic signals and for identifying characteristic similarities in said seismic signals within said multitrace record.

References Cited in the file of this patent

UNITED STATES PATENTS

| | | |
|---|---|---|
| 2,616,965 | Hoeppner | Nov. 4, 1952 |
| 2,672,284 | Dickenson | Mar. 16, 1954 |
| 2,700,501 | Wang | Jan. 25, 1955 |
| 2,700,750 | Dickinson | Jan. 25, 1955 |
| 2,793,360 | Beaumont | May 21, 1957 |

OTHER REFERENCES

Slaughter: An Analog-to-Digital Converter With an Improved Linear-Sweep Generator, Convention Record of the I.R.E. National Convention, Part 7 (March 23-26, 1953), pp. 7 to 12.

"Pulse Height Analyzer," The Review of Scientific Instruments, November 1953, pp. 1017-1020.